Figure 2:
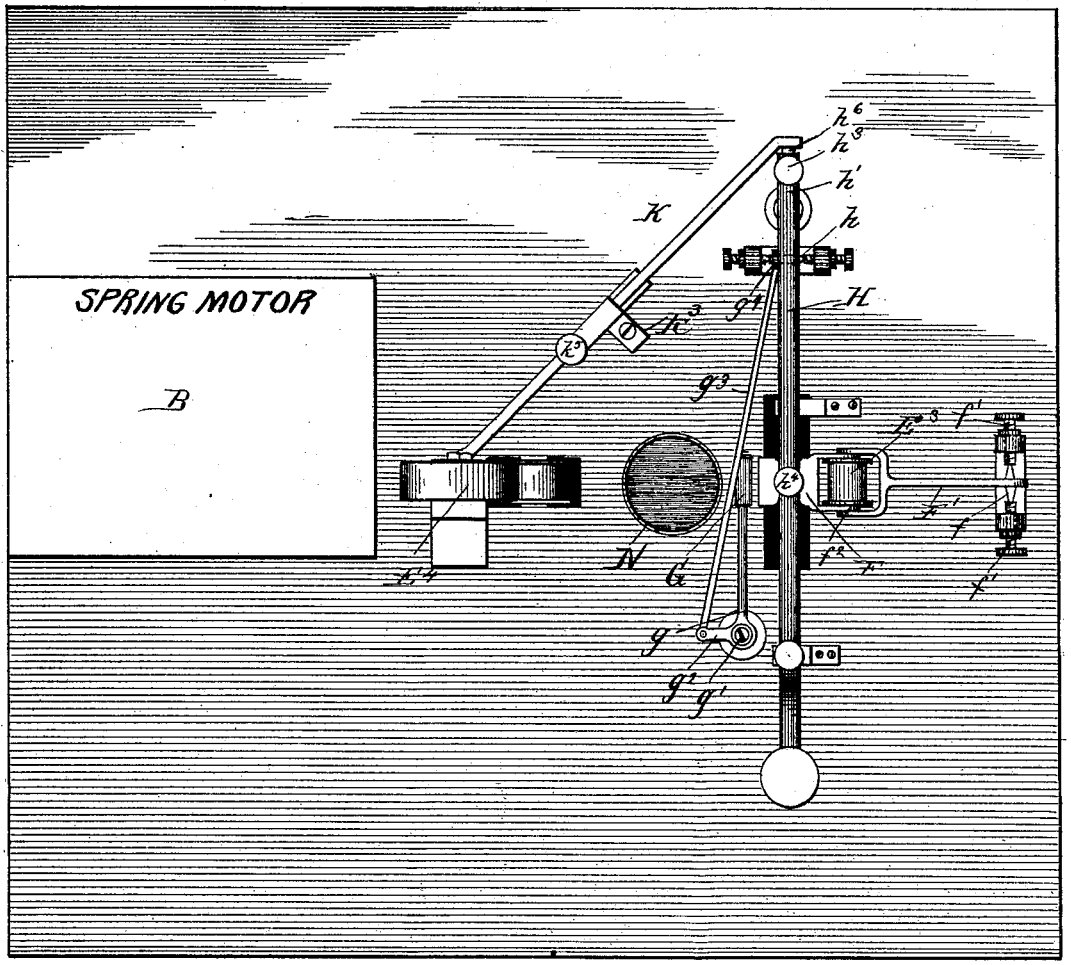

(No Model.)
E. H. AMET.
AUTOMATIC WEIGHING AND RECORDING SCALE.
No. 380,672. Patented Apr. 10, 1888.
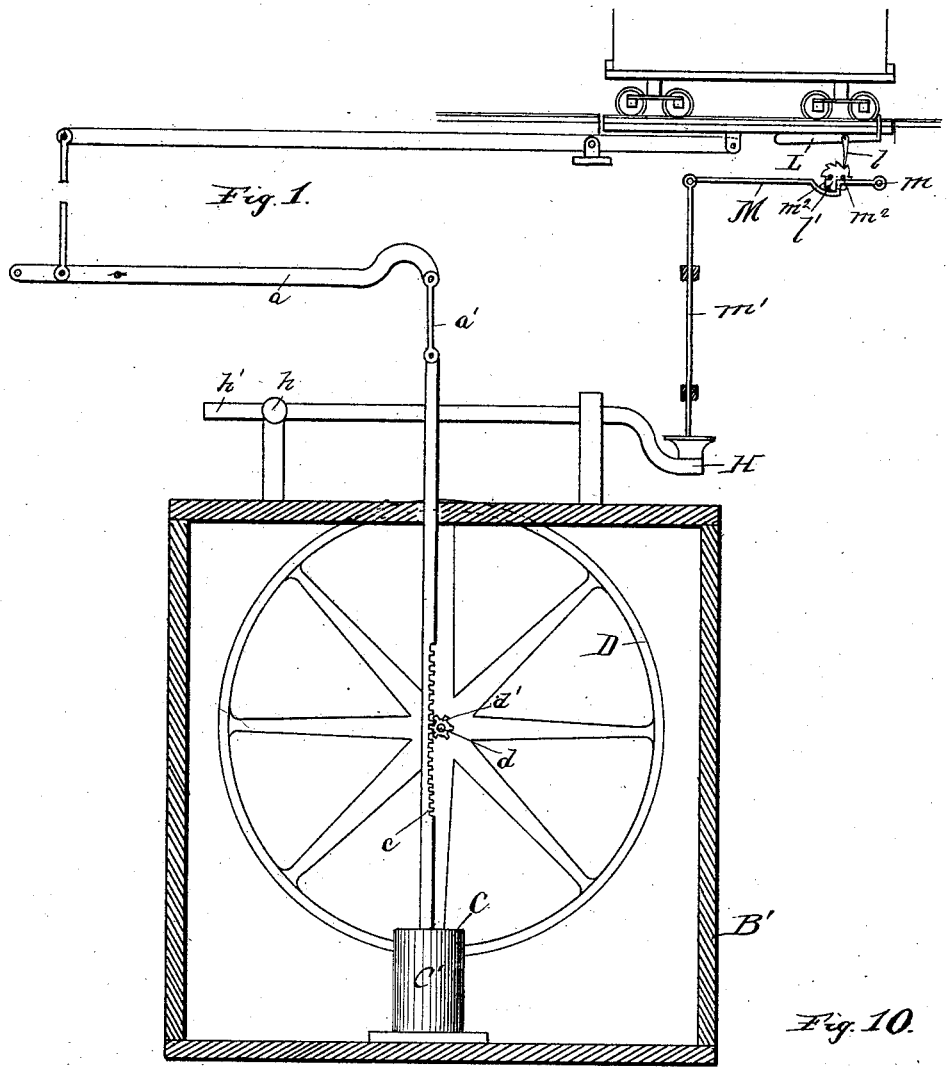
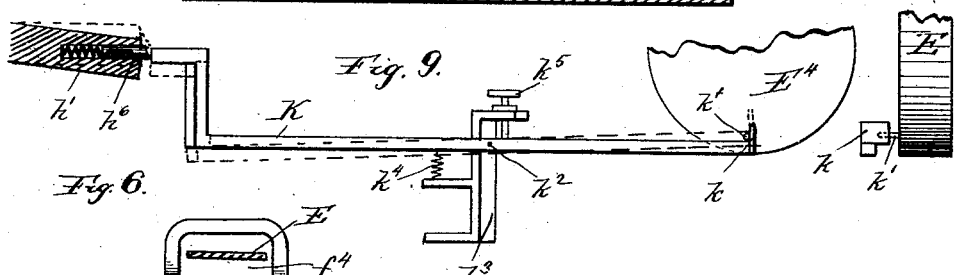
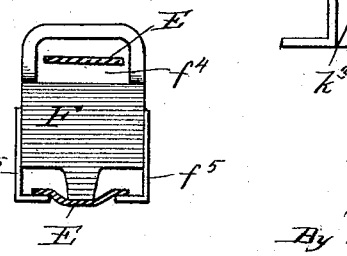

(No Model.)  5 Sheets—Sheet 2.

E. H. AMET.
AUTOMATIC WEIGHING AND RECORDING SCALE.

No. 380,672.  Patented Apr. 10, 1888.

Witnesses:
Leo. E. Curtis.
H. W. Munday.

Inventor:
Edward H. Amet.
By Munday, Evarts & Adcock
his Attorneys.

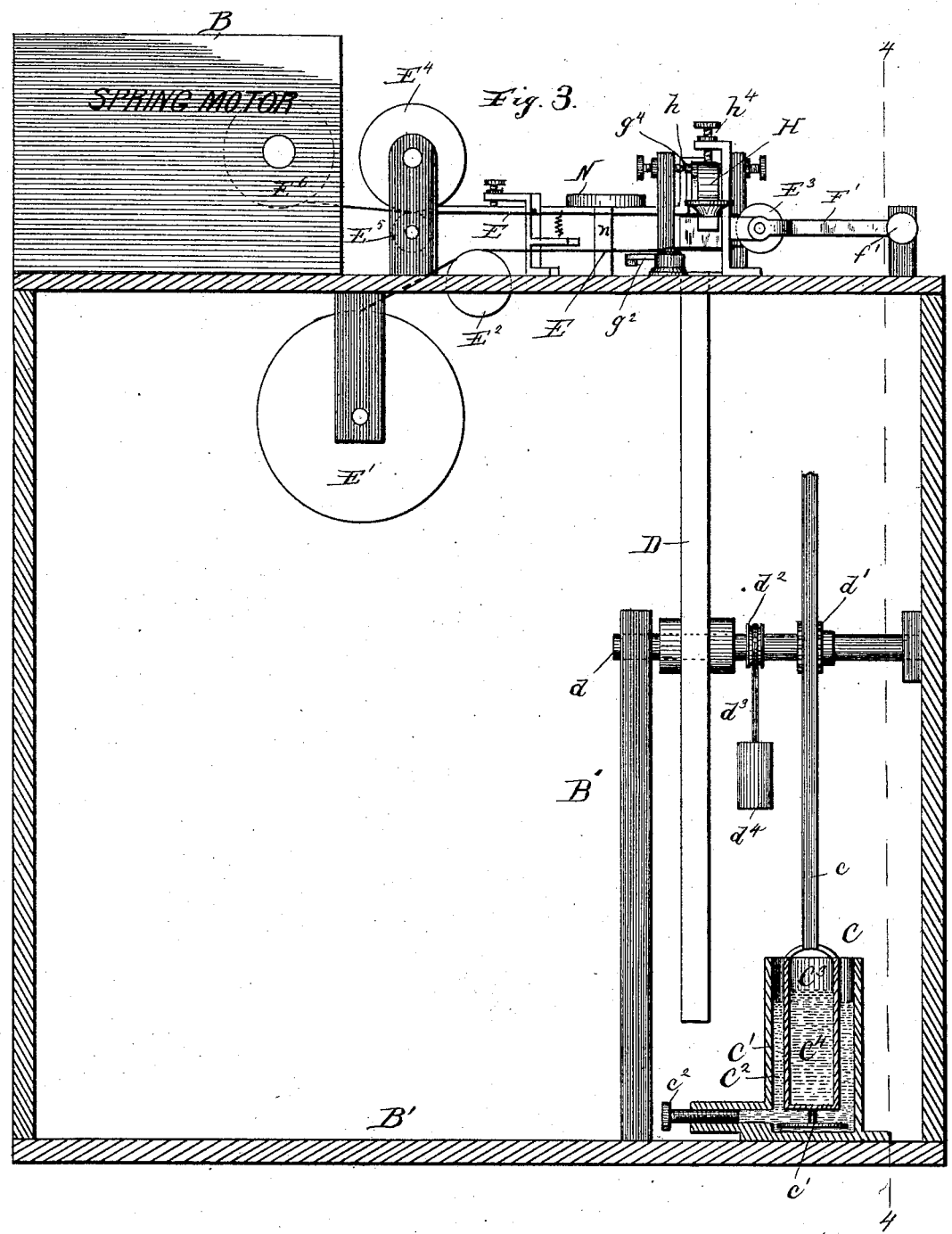

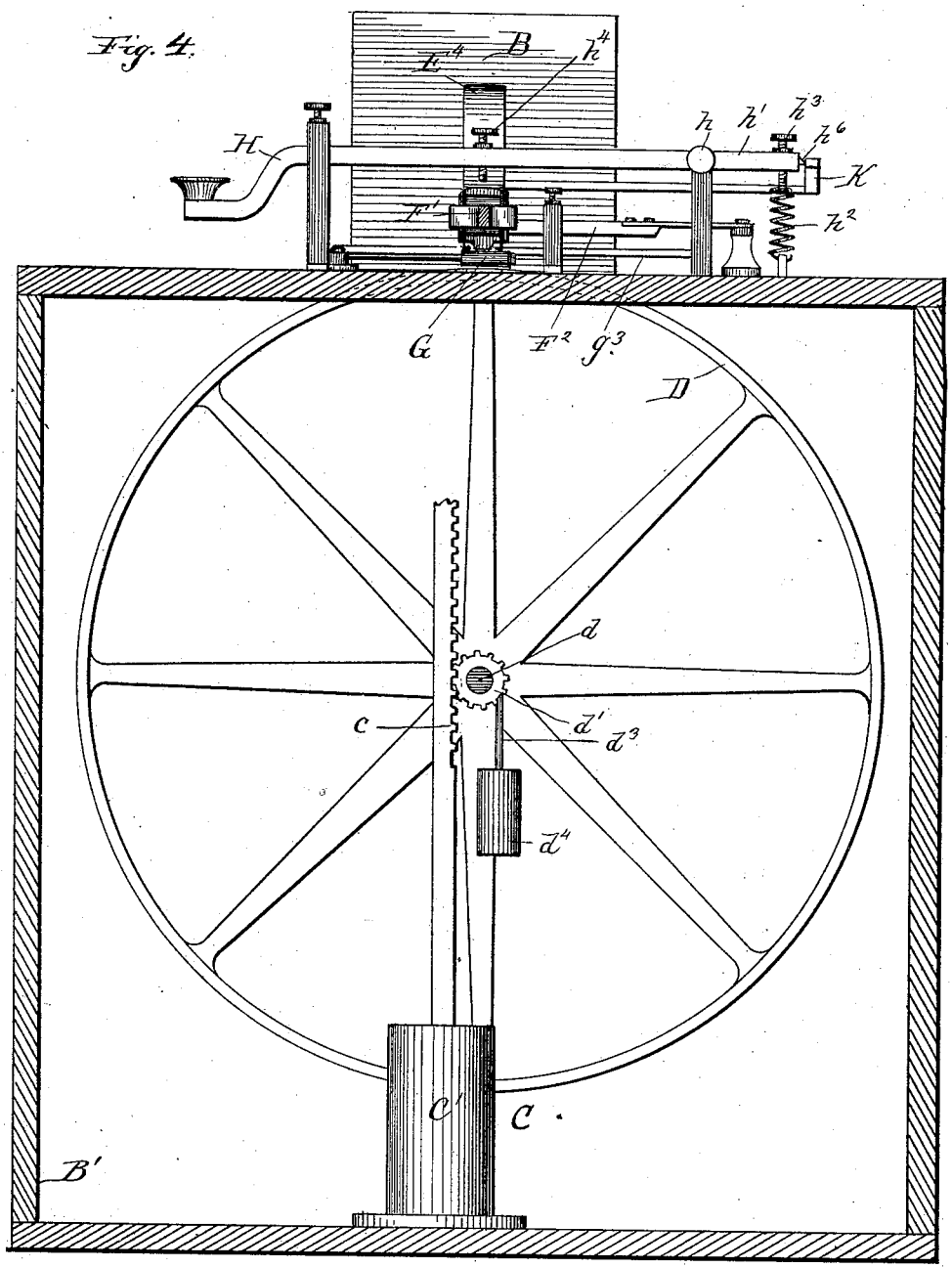

(No Model.) 5 Sheets—Sheet 5.
E. H. AMET.
AUTOMATIC WEIGHING AND RECORDING SCALE.
No. 380,672. Patented Apr. 10, 1888.
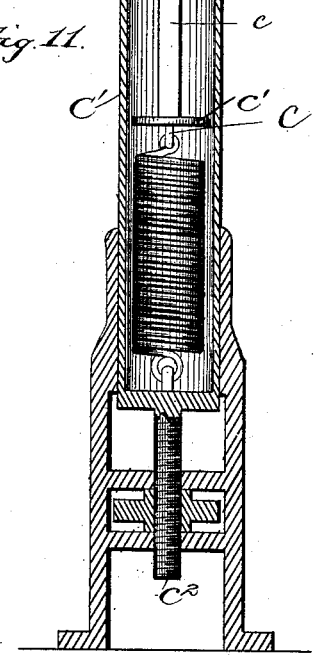
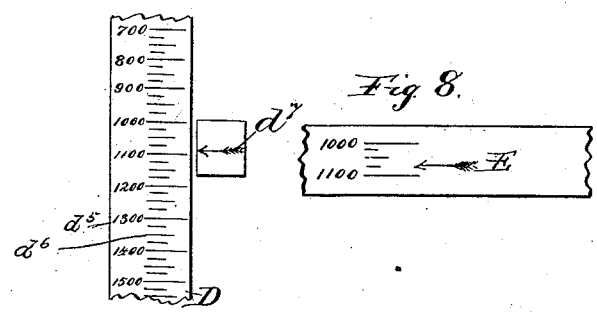
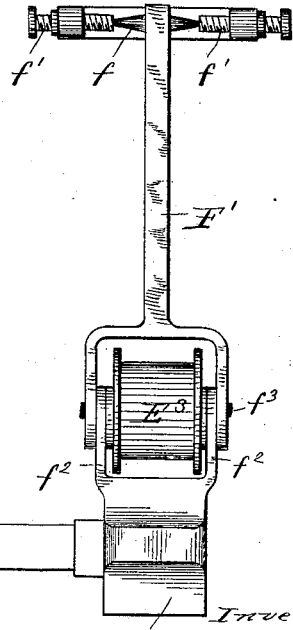

UNITED STATES PATENT OFFICE.

EDWARD H. AMET, OF CHICAGO, ILLINOIS, ASSIGNOR TO HERBERT A. STREETER, OF SAME PLACE.

AUTOMATIC WEIGHING AND RECORDING SCALE.

SPECIFICATION forming part of Letters Patent No. 380,672, dated April 10, 1888.

Application filed September 5, 1887. Serial No. 248,719. (No model.)

*To all whom it may concern:*

Be it known that I, EDWARD H. AMET, a citizen of the United States, residing in Chicago, in the county of Cook and State of Illinois, have invented a new and useful Improvement in Automatic Weighing and Recording Scales, of which the following is a specification.

My invention relates to apparatus for automatically weighing and recording weights.

The invention consists in the novel devices and novel combinations of devices herein shown and described, and more particularly pointed out in the claims, whereby different articles or loads may be accurately weighed and their weights simultaneously recorded.

In the accompanying drawings, which form a part of this specification, and in which similar letters of reference indicate like parts, Figure 1 is a side elevation of the weighing and recording apparatus, showing its box in section, and showing also in elevation, on a reduced scale, a platform-scale such as may be used for weighing cars, and the connection of the weighing and recording mechanism therewith. In this figure some of the parts of the weighing and recording mechanism are omitted, the object being in this figure simply to show its combination with the platform or other scale. Fig. 2 is a plan view showing the weighing and recording mechanism. Fig. 3 is a front view of the weighing and recording mechanism, the box or case being in section. Fig. 4 is a section taken on line 4 4 of Fig. 3, showing the weighing and recording mechanism in elevation. Fig. 5 is an enlarged detail plan view of the printing block and lever. Fig. 6 is an end view of the printing-block. Fig. 7 is an enlarged face view of a portion of the type-wheel. Fig. 8 shows a portion of the tape or paper strip as printed. Fig. 9 is a rear elevation of the paper-strip-feed-operating lever. Fig. 10 is an end view of the lever shown in Fig. 9, and Fig. 11 shows a modification in which an ordinary spring-balance is employed as the variable poise or counter-balance in place of the weight immersed in mercury.

In said drawings, A represents a weighing-scale, which is or may be of any well-known or usual construction, and adapted for weighing cars, wagons, or light articles weighing only a few pounds or hundreds of pounds. My weighing and recording mechanism is connected directly to one of the scale levers or beams, as $a$.

B represents a spring-motor, which may be of any usual and well-known construction, and need not therefore be particularly shown or described. It operates the paper-feed and serves to keep the paper strip under proper tension. The scale-lever $a$ is connected by a link, $a'$, to the variable poise or counter-balance C, furnished with a rack-bar, $c$. This variable poise may consist of an ordinary spring-balance, as shown in Fig. 11; but I prefer to employ as the variable poise a weight immersed to a greater or less extent in a cup of mercury or other liquid. I prefer to employ mercury as the liquid in which the weight is immersed; and a minor feature of my invention consists in making the weight in the form of a hollow cup filled to a greater or less extent with the same liquid, so that the specific gravity of the weight will approximate that of the liquid in which it is immersed.

$C'$ represents the mercury-containing vessel; $C^2$, the mercury therein; $C^3$, the weight-cup; and $C^4$ the mercury in the weight-cup. The weight-cup $C^3$ is furnished with a disk, $c'$, near its bottom, which is larger in diameter than the weight, and loosely fits the mercury-containing cylinder $C'$, so as to operate in a measure as a dash-pot, and thus prevent any sudden or jerking movement of the rack-bar $c$. The counterpoise C may be adjusted so as to balance the scale by an adjusting-screw, $c^2$, which will vary the height of the mercury or liquid in the weight-submerging vessel $C'$. In case a spring should be used for the variable counterpoise C this adjusting-screw $c^2$ will vary the tension of the spring, and thus balance the scale.

As shown in Fig. 11, a spring counter-balance is employed, and the dash-pot disk or piston $c'$ is preferably secured to the rod or rack $c$ just above the spring. In this case the dash-pot or vessel $C'$, in which the piston-disk $c'$ reciprocates to regulate and steady the motion of the type-wheel shaft, and thus bring the wheel quickly to rest, need not necessarily be filled with any liquid, as the air may serve the same function, and by its admission or escape from the vessel C' or around the piston c' control the movement of the rack c and printing-wheel or pointer.

D is the type-wheel, mounted upon the shaft d, journaled in suitable bearings in the case or frame B'. This shaft d is furnished with a gear, d', which meshes with the rack c, so that whatever movement may be imparted to the rack c will be communicated to the type-wheel D. The shaft d is furnished with a small pulley, $d^2$, carrying a cord, $d^3$, from which is suspended a light weight, $d^4$, which should be just heavy enough to counterbalance the friction of the shaft d and its bearings and of the gear and rack d' c, so that the weight recorded will not be influenced by the friction of these parts.

It will be observed that the weight is so combined with the axle d that it tends to turn said shaft in the same direction that it is turned by the rack c when moved by the load upon the scale-platform. By thus counterbalancing the shaft d or its friction, the operation of the apparatus is made much more sensitive and the weighing very accurate.

The type or figures $d^5$ are made upon the peripheral face of the type-wheel D. The type-wheel represented in the drawings is designed for a car-scale, and is graduated to hundreds of pounds, as shown in Fig. 6, with division-marks $d^6$ between indicating every twenty-five pounds. The stationary arrow or pointer printing-type $d^7$, which is mounted on the frame of the machine, is also printed upon the tape, and will indicate the true weight between two consecutive hundred-pound type-marks as printed by the wheel. By this arrangement I am enabled to indicate the true weight within twenty-five pounds or less and still employ a comparatively small type-wheel, even for a car-scale, where the weights to be weighed of course vary many tons.

E is the ribbon or strip of paper upon which the weights are to be printed. It passes transversely across the wheel just below the printing block or hammer F.

E' represents the paper-roll from which the paper strip is unwound.

$E^2$ is a guide-roll over which the paper ribbon or strip passes.

$E^3$ is another guide-roll which is mounted upon the printing-lever F', and $E^4 E^5$ are paper guide and holding rollers.

$E^6$ is the roller within the spring-motor, around which the printed paper is wound. The holding-rollers $E^4 E^5$ serve by clamping the paper between them to prevent the feeding or winding of the paper except at intervals, as required, when the holding-roller $E^4$ is released and permitted to revolve the proper distance to feed the paper forward sufficiently to receive the impression of the next weight.

F is the printing-block mounted on the end of the flat spring $F^2$. The printing-lever F' has a needle-point pivot, f, which is journaled in the bearing screws f' f'. The printing-block F is secured rigidly to the flat spring $F^2$, and is provided with arms $f^2$, which are pivoted to the shaft $f^3$ of the guide-roll $E^3$. The printing-block F is furnished with an opening or passage, $f^4$, (see Fig. 6,) for the ribbon or paper to pass through, so that the printing-block may be struck by the key or lever without touching the paper or interfering with its feed. The printing-block F is further provided with a slotted guard-plate, $f^5$, so that only a limited portion of the paper strip can come in contact with the type-wheel.

G is the inking-roller. It has a vibratory movement in a horizontal plane transversely across the periphery of the type-wheel, so that its friction on the type-wheel will not materially tend to increase or diminish the extent of movement of the type-wheel. The inking-roller G is journaled on a crank-arm, g, pivoted at g' to the frame of the machine. The short arm $g^2$ of this bent lever g is connected by a link, $g^3$, with an arm or projection, $g^4$, on the key-lever H. The key-lever H is journaled or pivoted at h to the frame of the machine, and is provided with a short arm, h', which is furnished with a spring, $h^2$, and an adjusting-screw, $h^3$. The key-lever H is also provided with an adjustable hammer or screw, $h^4$, which strikes against the printing-block F. The same depression of the key-lever H will thus operate the inking-roller or swing it across the face of the type-wheel, and also depress the printing-block and make the impression. The short arm h' of the key-lever H is furnished with a sliding spring, pin, or pawl, $h^6$, which catches over the end of the pawl-lever K when the key-lever is making its backward or return movement, thus raising the opposite end of the pawl-lever K and disengaging the bent end k of said pawl-lever from the pin or notch k' in the ribbon-holding roller $E^4$, thus permitting such roller to revolve one revolution under the action of the spring-motor B, and thus feed the paper-ribbon E forward into position for printing the next weight. The pawl-lever K is pivoted at $k^2$ to the frame of the machine or a bracket, $k^3$, thereon. This pawl-lever is provided with a spring, $k^4$, to return it into position, and a set-screw, $k^5$, limits its movement.

Instead of operating the key-lever H by the hand or finger, it may, when desired, be operated automatically by the movement of the car or vehicle being weighed over the platform of the scale. In Fig. 1 I have shown this latter combination.

L is a pawl-lever, the end of which projects in the path of the wheel, so that the lever is depressed by each wheel of the car as it moves over the scale-platform. The pawl l of this lever operates a ratchet, l', which in turn operates the lever M, pivoted at m to the frame, and the free end of which is connected or pivoted to the sliding rod m', which communicates the motion to the key-lever H. The ratchet has eight teeth, and is furnished with only two pins, $m^2 m^2$, to operate the lever M, so that the lever M will depress the key-lever only once in four times, or when the fourth and last wheel of the car passes over the pawl-lever L.

N is a magnifying-glass mounted on a bracket, n, directly over the printed strip of paper, and so combined in relation to the paper-feed that the last printed weight will stop directly under the magnifying-glass, so that the position of the pointer-arrow $d^7$ in relation to the figures and division-marks made by the type-wheel may be readily seen and read. This combination of the magnifying-glass with the paper-feed, type-wheel, and stationary pointer printing-type enables me to employ a much smaller, lighter, and more easily-moved type-wheel, and thus materially contributes to the sensitiveness and accuracy of the machine.

In operation, as the car moves over the platform of the scale, each of its wheels will operate the pawl-lever L, and as the fourth and last wheel of the car operates said lever the pawl-lever will in turn operate through the lever M the key-lever H, and thus operate the inking-roller G and the printing-block F, and thereby print upon the paper strip the true weight of the car. As the key-lever H makes its return movement the pawl-lever K will be operated to release the paper-holding roller $E^4$, and thus permit the spring-motor B to wind or feed forward the paper strip the distance equal to the circumference of the holding-roller $E^4$. The movement of the pawl-lever K to release the holding-roller is immediately followed by its return movement into place to stop the revolution of the holding-roller $E^4$, so that said roller can make but one revolution at a time.

The holding-roller $E^4$ may be provided with a number of stop-pins, $k'$, if desired, to cause the printings to be made on the paper strip closer together.

In case it is not desired to operate the key-lever H automatically, it may be operated by hand. This is specially desirable on small scales for weighing small articles, which are placed upon the scale.

It will be observed that, whether the key-lever is operated by hand or automatically, the operation does not take place until after the weight upon the scale or scale-platform has moved the type-wheel to its proper or balanced position to indicate and print the true weight.

I claim—

1. The combination, with a scale and one of its scale-levers, of a variable counterpoise, a rack-bar connected therewith, a type-wheel having a shaft furnished with a gear meshing with said rack, an inking-roller, a printing-block, and a key-lever connected with said inking-roller and printing-block for operating the same, substantially as specified.

2. The combination, with a scale and one of its scale-levers, of a variable counterpoise, a rack-bar connected therewith, a type-wheel having a shaft furnished with a gear meshing with said rack, an inking-roller mounted on a vibratory arm or lever swinging transversely across the periphery of said type-wheel, substantially as specified.

3. The combination, with a scale and one of its scale-levers, of a variable counterpoise, a rack-bar connected therewith, a type-wheel having a shaft furnished with a gear meshing with said rack, said shaft being provided with a counterbalance-weight, as $d^4$, to compensate for the friction of the moving parts, substantially as specified.

4. The combination, with a scale, of a variable counterpoise, a rack-bar, $c$, connecting said variable counterpoise with one of the scale-levers, gear $d'$, meshing with said rack-bar and connected with the device for indicating the weight, a dash-pot, and its piston connected with said rack-bar for regulating the movement thereof, substantially as specified.

5. The combination, with a scale, of a variable counterpoise consisting of mercury-containing vessel $C'$, mercury $C^2$ therein, movable weight-cup $C^3$, mercury $C^4$ therein, said weight $C^3$ $C^4$ being connected with one of the scale-levers, and said mercury-vessel $C'$ being provided with an adjusting-screw, $c^2$, substantially as specified.

6. The combination, with a scale, of a variable counterpoise consisting of mercury-containing vessel $C'$, mercury $C^2$ therein, movable weight-cup $C^3$, mercury $C^4$ therein, said weight $C^3$ $C^4$ being connected with one of the scale-levers, and rack-bar $c$, type-wheel D, shaft $d$, and gear $d'$, substantially as specified.

7. The combination, with a scale, of a variable counterpoise consisting of mercury-containing vessel $C'$, mercury $C^2$ therein, movable weight-cup $C^3$, mercury $C^4$ therein, said weight $C^3$ $C^4$ being connected with one of the scale-levers, and rack-bar $c$, type-wheel D, shaft $d$, gear $d'$, inking-roller G, mounted on vibratory lever $g$, printing-block F, lever $F'$, spring $F^2$, and key-lever H, substantially as specified.

8. The combination, with a scale and one of its scale-levers, as $a$, of a variable counterpoise, C, rack-bar $c$, type-wheel D, shaft $d$, gear $d'$, paper-strip guide and holding rollers, inking-roller G, mounted on a transversely-moving vibratory arm, $g$, printing-block F, lever $F'$, spring $F^2$, pawl-lever K for releasing the paper-holding roller, and operating-lever H, substantially as specified.

9. The combination, with a scale and one of its scale-levers, as $a$, of a variable counterpoise, C, rack-bar $c$, type-wheel D, shaft $d$, gear $d'$, paper-strip guide and holding rollers, inking-roller G, mounted on a transversely-moving vibratory arm, $g$, printing-block F, lever $F'$, spring $F^2$, pawl-lever K for releasing the paper-holding roller, operating-lever H, pawl-lever L, operated by the wheel of the car, and mechanism connecting said pawl-lever with said operating-lever H, substantially as specified.

10. The combination, with a scale and one of its scale-levers, as $a$, of a variable counterpoise, C, rack-bar $c$, type-wheel D, shaft $d$, gear $d'$, paper-strip guide and holding rollers, inking-roller G, mounted on a transversely-moving vibratory arm, $g$, printing-block F, lever F', spring $F^2$, pawl-lever K for releasing the paper-holding roller, operating-lever H, and a spring-motor for winding up the paper strip, substantially as specified.

11. The combination, with a scale, of a variable counterpoise, C, rack $c$, type-wheel D, shaft $d$, gear $d'$, said type-wheel being furnished with type $d^5$, with division-marks $d^6$ between the same, and a stationary pointer printing-type, $d^7$, substantially as specified.

12. The combination, with a scale, a variable counterpoise, and type-wheel, of a strip-guide roller, $E^3$, lever F', upon which said roller is journaled, and a printing-block, F, pivoted to the shaft of said guide-roller, substantially as specified.

13. The combination, with a scale, a variable counterpoise, and type-wheel, of a paper-strip-guide roller, $E^3$, lever F', upon which said roller is journaled, and a printing-block, F, pivoted to the shaft of said guide-roller, and a spring, $F^2$, substantially as specified.

14. The combination, with a scale, of a variable counterpoise, C, rack $c$, type-wheel D, shaft $d$, gear $d'$, said type-wheel being furnished with type $d^5$, with division-marks $d^6$ between the same, a stationary pointer printing-type, $d^7$, and a magnifying-glass, N, substantially as specified.

15. The combination, with a scale and one of its scale-levers, as $a$, of a variable counterpoise, C, rack-bar $c$, type-wheel D, shaft $d$, gear $d'$, paper-strip guide and holding rollers, inking-roller G, mounted on a transversely-moving vibratory arm, $g$, printing-block F, lever F', spring $F^2$, pawl-lever K, for releasing the paper-holding roller, operating-lever H, link $g^3$, and arm $g^4$ on said lever H, substantially as specified.

16. The combination, with a scale and one of its scale-levers, as $a$, of a variable counterpoise, C, rack-bar $c$, type-wheel D, shaft $d$, gear $d'$, paper-strip guide and holding rollers, inking-roller G, mounted on a transversely-moving vibratory arm, $g$, printing-block F, lever F', spring $F^2$, pawl-lever K, for releasing the paper-holding roller, operating-lever H, arm $h'$, sliding spring-catch $h^6$, the holding-roller $E^4$ being furnished with stop-pin $k'$, engaging the bent end $k$ of said pawl-lever K, substantially as specified.

17. The combination, with a scale and one of its scale-levers, as $a$, of a variable counterpoise, C, rack-bar $c$, type-wheel D, shaft $d$, gear $d'$, paper-strip guide and holding rollers, inking-roller G, mounted on a transversely-moving vibratory arm, $g$, printing-block F, lever F', spring $F^2$, pawl-lever K, for releasing the paper-holding roller, operating-lever H, link $g^3$, arm $g^4$ on said lever H, arm $h'$, sliding spring-catch $h^6$, the holding-roller $E^4$ being journaled with stop-pin $k'$, engaging the bent end $k$ of said pawl-lever K, substantially as specified.

18. The combination, with a scale and one of its scale-levers, of a variable counterpoise, a rack-bar connected therewith, a type-wheel having a shaft furnished with a gear meshing with said rack, an inking-roller, a printing-block, and a key-lever connected with said inking-roller and printing-block for operating the same, a scale-platform, a lever adapted to be operated by the article to be weighed on the platform, and mechanism connecting said lever with said key-lever, substantially as specified.

EDWARD H. AMET.

Witnesses:
H. M. MUNDAY,
EDMUND ADCOCK.